J. W. YATES.
FUSIBLE LINK.
APPLICATION FILED JULY 25, 1910.
1,098,870.
Patented June 2, 1914.
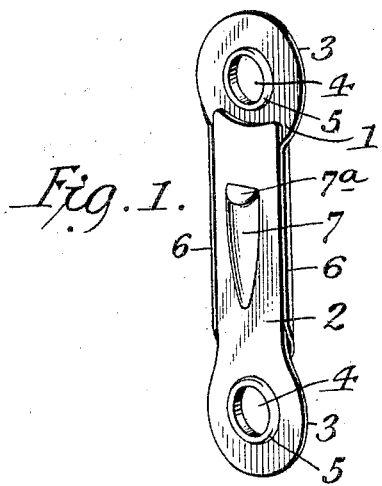
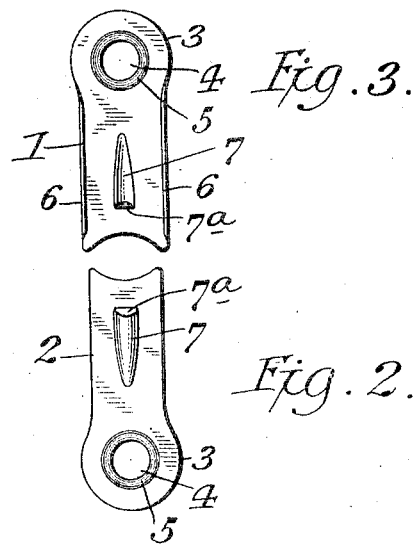
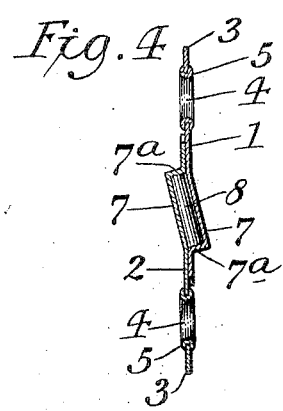
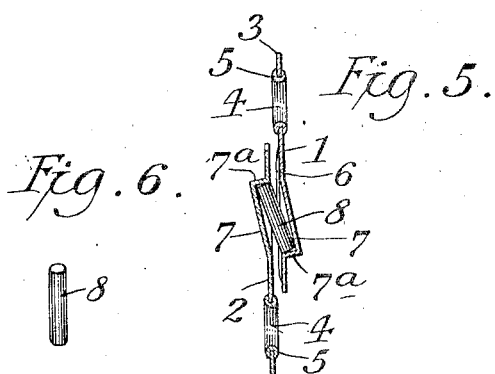
Witnesses:
A. R. Appleman
J. F. Mothershead
Inventor
John W. Yates,
By Attorney
Griffin Bernhard

UNITED STATES PATENT OFFICE.

JOHN W. YATES, OF NEW YORK, N. Y.

FUSIBLE LINK.

1,098,870.

Specification of Letters Patent.

Patented June 2, 1914.

Application filed July 25, 1910. Serial No. 573,820.

*To all whom it may concern:*

Be it known that I, JOHN W. YATES, a citizen of the United States, residing at New York, in the county of New York and State of New York, have invented a new and useful Fusible Link, of which the following is a specification.

This invention is a fusible link of that type designed for use as an element of a chain or other tensile support, commonly employed in connection with fire-proof doors, shutters or windows of ware-houses, etc., to retain them in an open position, the elements of which link separate or disrupt, owing to heat melting the solder of the link, whereupon the door or window automatically closes or falls.

The link forming the subject matter of the present invention may be said, generically, to embody three elements, to wit, two members, preferably substantially flat, adapted to be soldered together at their edges, and a weight carrying member positioned between them.

The salient features of novelty in the invention consist, first, in inclosing the weight carrying member between the flat member by providing the latter with complementary depressions or pockets on their inner faces in which depressions the weight carrying member rests; and, second, in positioning the weight carrying member so that its axis is out of alinement with the longitudinal axis of the two flat members, and preferably at an angle to the plane of union of said flat members. By concealing or incasing the weight carrying member as specified, it is not only completely protected from the action of the air, moisture, etc., but particularly from the acid and other corroding fumes and gases so frequently present in manufacturing plants. The efficiency of the weight carrying member is, in my construction, always fully retained. By positioning the weight carrying member with its axis as described, it will be manifest that the direction of pull on the link is normally out of alinement with the axis of said member. Accordingly, as soon as the solder between the incasing members has melted to any extent, the tension on the link quickly displaces said weight carrying member, thereby forcing the incasing members apart and disrupting the link. That is to say, the weight carrying member is "off center" in that its axis is not in alinement with the line of tension or strain on the link.

In the accompanying drawings, I have illustrated one practical embodiment of the invention, but the construction shown therein is to be understood as illustrative, only, and not as defining the limits of the invention.

Figure 1 is a perspective view of the link with the parts assembled and united. Fig. 2 is a plan view looking at the outer face on one incasing member. Fig. 3 is a plan view of the inner face of the other incasing member, showing the tapering pocket and the upturned flanges thereof. Fig. 4 is a longitudinal section through the complete link, illustrating the position of the weight carrying member when the parts of the link are in operative position. Fig. 5 is a longitudinal section through the link showing the positions of the incasing members and the weight carrying member as the parts of the link separate. Fig. 6 is a perspective view of the weight carrying member.

The link embodies in its construction two members, 1, 2, each of which is substantially rectangular in form, viewed in plan, each member being rounded or circular at one end, 3, thereof. Within each of the rounded ends, 3, of said members, 1, 2, is an eye, 4, provided with a bushing, 5, said bushing being flanged, as shown more clearly in Figs. 4 and 5, for the reception of a link of an ordinary chain. Parallel lips or flanges, 6, are formed at the edges of member, 1, said lips or flanges serving to preclude sidewise displacement of member, 2, when the members 1, 2, are assembled in operative relation.

Each member, 1, 2, is provided with a depression or pocket, 7, on the inner face thereof, said pocket being stamped or otherwise formed in the member in any suitable manner. The pocket, 7, may be of various forms or shapes, but in the drawings said pocket is shown as being positioned substantially at the central portion of the rectangular body of each member, 1, or, 2. The length of the pocket is substantially parallel to the length of the member; but it is obvious that the invention is not limited to this precise position or location of the pocket in the member. Pocket 7, is, preferably, deeper at one end than at the other, said pocket being provided with a shoulder, 7ª, at one end thereof, the pocket being gradually tapered or reduced in both depth and width toward the other end. In the preferred construction the end, of greatest depth and width of the pocket, is adjacent the substantially squared ends, of members, 1, 2, and the shallow narrow end of the pocket is nearest the rounded end, 3, of said members. When the members, 1, 2, are assembled, the pockets thereof will register or coincide, that is, the shoulders, 7ª, are positioned opposite to the tapered ends, thereby producing a chamber within which is loosely positioned a strut or weight carrying member, 8. This member, or strut 8, is preferably cylindrical, the end faces thereof being substantially at right angles to the body portion. Said ends of the strut, 8, are adapted to abut against the shoulders, 7ª, of the respective members, 1, 2, when the several parts are assembled in operative relation, as in Fig. 4.

To assemble the parts, the strut, 8, is placed within the pocket of one of the members, for example 1, in such a manner that one end of the strut abuts against the shoulder, 7ª, of the pocket. The other member, 2, is now placed over or against member, 1, the shouldered end, 7ª, of the pocket of member, 2, fitting against end of strut, 8, and said end is opposite to the end of the pocket of member, 1, to form a chamber between said members. The edges, of member, 2, abut against the inner faces of the lips or flanges, 6, of member, 1, to prevent sidewise movement of the members relative to each other. When the parts are thus assembled, they are retained in the positions described by applying solder, which is fusible to a low degree of heat, along the meeting edges of said members composing the link, or the members may be united in any other suitable way.

It will be observed that the weight carrying member or strut, 8, is completely concealed within, or incased by, the incasing members, 1, 2, which protect it from displacement or from corrosion, etc., thus preserving the efficiency of the link at all times. Furthermore, the axis of strut, 8, is not in the plane of the longitudinal axis of the members, 1, 2, but it is at an angle to the members. It will be observed, also, that strut 8 extends lengthwise of the link, said strut being so positioned that its longitudinal axis is diagonal to the longitudinal axis of the link. When so positioned, it is obvious that the strain or the pull or weight upon the link is borne by the member, 8, the ends of which abut against the shoulders, 7ª, of the incasing members, the fusible solder serving merely to prevent horizontal or sidewise separation of the incasing members, when the link is used under normal conditions, as will be readily understood from Fig. 4.

In operation, the fusible link forms one of a series of links of an ordinary chain, such as is commonly employed in fire-proof building construction, the links of said chain being united to the fusible link through the eyes, 4. Should a fire-proof window or a door be retained in an opened position by a chain provided with a link embodying my invention, and should the temperature of the air surrounding the link be raised to a point sufficient to melt the solder, the incasing members, 1, 2, of my fusible separable link will no longer be prevented from sidewise movement by the solder, and the strain applied to the chain will become centered upon the strut or weight carrying member, 8. As this member, 8, is positioned between incasing members 1 and 2, so that the longitudinal axis of strut 8 is diagonal, or at an angle to the longitudinal axis of members, 1, 2, the strain or pull on the ends of the weight carrying member, 8, will cause the said member to turn on an axis which is at an angle to the longitudinal axis of the incasing members, 1, 2. This turning movement of member, 8, forces members, 1, 2, apart, disrupting the link, as shown in Fig. 5, (member, 8, falling out of pocket, 7), and this action at once releases the tension upon the chain, thereby permitting the closing of the window or door to which the chain is applied.

Having thus fully described the invention, what I claim as new, and desire to secure by Letters Patent is:—

1. A fusible link embodying two complementary members each of which comprises a substantially flat portion, means at one end of each of said flat portions for securing a chain or cable thereto, a pocket in the inner face of each of said flat portions, said pockets being semiconical in shape with their axes in substantially the longitudinal transverse medial line of the link and the deep ends of said pockets being at the opposite ends of their respective flat portions from the chain securing ends thereof, whereby the positioning of the complementary members in lapped relation, with the chain securing ends of the respective members at opposite ends of the link, their pockets will register and form a cylindrical chamber having its axis in the longitudinal transverse medial line of the link and inclined to the meeting faces of the two members of said link, in combination with fusible solder for uniting the complementary members, and an elongated cylindrical key pin, in length substantially equal to the length of aforesaid cylindrical chamber, and adapted to be positioned within said chamber whereby the pull exerted on the different members of the link by their respective chains will be transmitted to, and carried by said key pin.

2. A fusible link embodying a pair of complementary members each of which comprises a substantially flat portion, means at one end of each of said flat portions whereby a chain or cable may be secured thereto, a longitudinally extending tapered pocket formed in the inner face of each of said flat portions and so positioned therein that when said complementary members are placed in lapped relation with their chain attaching ends at opposite ends of the link, the two pockets will together form a chamber having its axis inclined to the meeting faces of the members and lying in substantially the longitudinal transverse medial plane of the link, in combination with fusible solder uniting said complementary members, and a key pin of such shape as to snugly fit within the chamber, said key pin having flat ends which abut the ends of the chamber, whereby the tension on the chains at the respective ends of the link will be sustained by said key pin.

3. A fusible link embodying a substantially flat member provided at its upper end with means for securing a chain or cable thereto, said member having a comparatively narrow pocket in one face thereof extending longitudinally of the member and the axis of which pocket is inclined to the plane of said member, a second substantially flat member provided at its lower end with means for securing a chain or cable thereto, said second member also having a comparatively narrow pocket in one face thereof, and the axis of which pocket is inclined to the plane of said second member, said pockets being adapted to register and form a closed chamber when the said members are positioned one on the other, fusible solder uniting said members and a key pin positioned within said chamber with its axis inclined to the faces of said plates and having its upper end abutting the upper end wall of the socket in said second plate and its lower end abutting the lower end wall of said other member, whereby said key acts as a weight sustaining member, but when said solder is fused or disrupted, said pin, by virtue of its inclination, acts as a fulcrum to assist in quickly separating the members of the link.

4. A fusible link embodying two complementary members each of which is provided on its inner face with a depression or pocket, said depressions being adapted to register with each other when the members are placed in lapped relation whereby an elongated chamber is formed having its longitudinal axis extending lengthwise of said members, a pin positioned within said pocket and having its axis also extending lengthwise of said members, and fusible solder uniting the members.

5. A fusible link embodying two lapped members each of which is provided with a depression, said depressions registering so as to form a substantially closed chamber, a key member positioned within said chamber and having its longitudinal axis extending in the direction of the line of pull on the link, and fusible solder uniting the lapped members whereby the key member is retained within said chamber.

JOHN W. YATES.

Witnesses:
  D. H. MUNROE,
  ROBT. G. GRUNERT.